(No Model.)
S. A. BURNS.
CAR BRAKE.
No. 369,159. Patented Aug. 30, 1887.
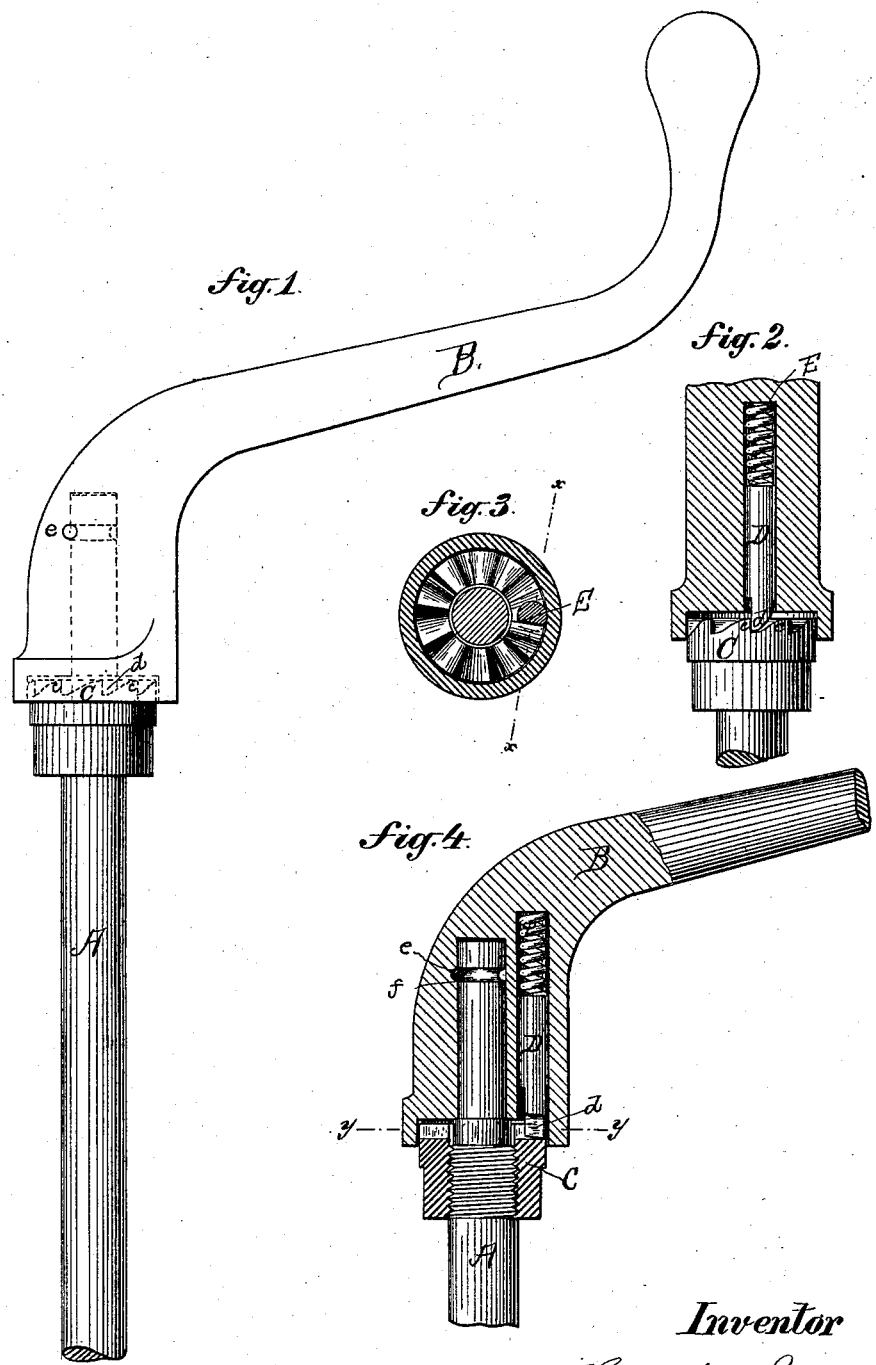
Witnesses:
Henry Eshling
Nathan Levanson
Inventor
Samuel A. Burns
By [signature]
his atty.

UNITED STATES PATENT OFFICE.

SAMUEL A. BURNS, OF NEW YORK, N. Y., ASSIGNOR TO HIMSELF AND JOHN S. SILVER, OF SAME PLACE.

CAR-BRAKE.

SPECIFICATION forming part of Letters Patent No. 369,159, dated August 30, 1887.

Application filed November 9, 1885. Serial No. 182,216. (No model.)

*To all whom it may concern:*

Be it known that I, SAMUEL A. BURNS, a citizen of the United States, and a resident of the city, county, and State of New York, have invented certain new and useful Improvements in Car-Brakes, of which the following, taken in connection with the accompanying drawings, is a specification.

This invention relates to that class of car-brakes which are designed for use upon street-cars, and especially to that class in which a clutch or a pawl-and-ratchet mechanism is made use of to adjust the crank-handle upon the brake-rod to suit it to the convenience of the brakeman.

Heretofore in the construction of this class of brakes a clutch member having teeth upon its under side has been connected to the hub of the crank by which the brake is operated, and has been held in contact with a fellow member fixedly secured to the brake-rod below by a spring inclosed within said crank-hub, whereby when the crank was revolved in one direction—as when required to set the brake—the clutch members were engaged and the brake-rod revolved therewith, but when turned in the opposite direction the teeth of the upper member were capable of movement over the teeth of the lower member, leaving said brake-rod stationary and undisturbed. This construction, while effective under certain conditions, has been found defective under others, by reason of the fact that the parts comprising the same were exposed to the action of the moisture, and either rusted, so as to be exceedingly difficult of operation, or in the colder seasons congealed together, so as to be wholly incapable of movement of the one upon the other.

The object of my invention is to obviate these objectionable features and to produce a brake mechanism which shall be simple and inexpensive in construction and effective in operation.

To this end my invention consists in the combination, with a brake-rod and a crank journaled to the upper end thereof, of a toothed hub or collar secured to said brake-rod, a flange upon the lower end of the crank-hub extending down and around said hub or collar, and a spring-actuated locking-pin carried in a socket or chamber formed in the lower end of the crank-hub, for engagement with the teeth in the hub or collar, all as hereinafter described.

Referring to the drawings, Figure 1 is a view in elevation of a portion of a brake-rod and a crank for operating the same with my invention applied thereto. Fig. 2 is a sectional view of the same, taken on the line $x\ x$ of Fig. 3. Fig. 3 is a horizontal sectional view of the parts taken on the line $y\ y$ of Fig. 4; and Fig. 4 is a view in elevation of the parts comprising my invention, the ratchet and a portion of the crank being shown in section.

A is a brake-rod, which is or may be of any suitable or well-known construction, and is provided near its upper end with a hub or collar, C, in the upper side of which are formed radially-arranged ratchet-teeth $c$, as shown. The portion of the brake-rod extending above the hub or collar C is preferably reduced somewhat in diameter to receive the socket of the brake handle or crank B, which is fitted thereto so as to be capable of revolving upon it. This brake handle or crank is or may be of the ordinary form, and is provided at its lower end with a depending circumferential flange, which extends down and around the upper end of the hub or collar C, and serves to exclude all moisture and other foreign substances from the teeth thereof and from the parts connected with the handle or crank.

D is a bolt or pawl having its lower end constructed with a suitably-formed toe for engagement with the teeth $c$ in the hub or collar C. This bolt or pawl is arranged within a socket or chamber formed in the lower end of the brake arm or crank eccentrically to its axis, and is held in contact with the said teeth by means of the spring E, so that while capable of movement over them when the brake arm or crank is turned in one direction it engages with them when revolved in the other, and causes them, with the brake-rod, to rotate with it.

$e$ is a pin by means of which and the circumferential groove $f$ the accidental removal of the brake handle or crank from the brake-rod is prevented.

With the parts above described it is to be understood that I employ the usual ratchet and toe-dog to hold the brakes "set" when brought into that position.

The operation of my devices for effecting the adjustment of the brake handle or crank is substantially the same as that of others of this class, and is as follows: The brakes are first set by rotating the brake handle or crank a sufficient number of times in the proper direction—say from left to right—to press them tightly against the wheels of the car. The toe-dog is then brought into engagement with the usual retaining-ratchet, holding them securely in that position. The brake handle or crank is then reversed and turned in the opposite direction until the proper adjustment is effected, the bolt or pawl D riding over the teeth c in the collar C and permitting of this movement. When the proper position in the backward rotation is reached, the brake handle or crank is turned in the first-mentioned direction, the bolt or pawl engaging with the teeth in the hub or collar C and carrying them, with the brake-rod, forward with it.

By the construction of parts above set forth a very simple, cheap, and efficient mechanism for this purpose is produced, and as all of the operative parts are included within the hub of the brake handle or crank, which is cut or bored out to accommodate them, leaving no joints or seams, the danger incident to moisture and other foreign substances therein is wholly obviated.

I am aware that it is not new to provide the brake-rod with a ratchet near its upper end, and to provide the hub of the crank which is pivoted to said brake-rod with a pawl or projection which may be brought into engagement with the ratchet by rocking said hub in one direction and carried out of engagement therewith by rocking it in the other.

I am also aware that it is not new to combine in a ratchet-brace two crown-ratchet heads, an intermediate pawl-carrying barrel, pawls for engaging with said ratchet-heads, and a locking device by means of which such pawl-carrying barrel may be locked to either of the ratchet-heads, as desired. Neither of these constructions, therefore, do I claim; but What I do claim, and desire to secure by Letters Patent, is—

1. The combination, with the brake-rod and a hub or collar secured thereto near its upper end and provided with teeth in its upper side, of a brake handle or crank journaled to the upper end of said brake-rod and provided with a depending circumferential flange which extends down and around the upper end of such hub or collar, and locking devices for engaging with said teeth, as and for the purpose set forth.

2. The combination, with the brake-rod and a hub or collar secured thereto near its upper end and provided with teeth in its upper side, of a brake handle or crank journaled to the upper end of said brake-rod and provided with a depending circumferential flange which extends down and around the upper end of such hub or collar, and spring-actuated locking-bolts carried by said brake handle or crank for engagement with said teeth, as and for the purpose set forth.

Witness my hand this 31st day of October, A. D. 1885.

SAMUEL A. BURNS.

Witnesses:
CHAS. R. CLARKE,
CARRIE M. SIMONDS.